United States Patent [19]

Carbonnel

[11] 4,213,494
[45] Jul. 22, 1980

[54] PROCESS AND APPARATUS FOR LOW PRESSURE CASTING

[75] Inventor: Henri Carbonnel, Antony, France

[73] Assignee: Novatome, Le Plessis Robinson, France

[21] Appl. No.: 915,209

[22] Filed: Jun. 13, 1978

[30] Foreign Application Priority Data

Jun. 15, 1977 [FR] France ................. 77 18395

[51] Int. Cl.³ ............... B22D 18/04; B22D 18/08
[52] U.S. Cl. ......................... 164/4; 164/49; 164/155; 164/147
[58] Field of Search ............ 164/4, 49, 147, 119, 164/120, 155, 303, 312

[56] References Cited

U.S. PATENT DOCUMENTS 3,842,893  10/1974  Booth .................. 164/155
4,050,503  9/1977  Balevski et al. .............. 164/4

FOREIGN PATENT DOCUMENTS 44-4399  2/1969  Japan .......................... 164/4
51-43317  4/1976  Japan ......................... 164/155

*Primary Examiner*—Robert D. Baldwin
*Assistant Examiner*—K. Y. Lin
*Attorney, Agent, or Firm*—Haseltine, Lake & Waters

[57] ABSTRACT

In the low pressure casting of a metal in a mould supplied from below by an electromagnetic pump, the durations of the various stages of the moulding cycle are determined in dependence on the temperature of the mould, the temperature of the metal in the mould and the temperature of the metal in the furnace to obtain optimum casting conditions despite variations in these temperatures.

8 Claims, 6 Drawing Figures

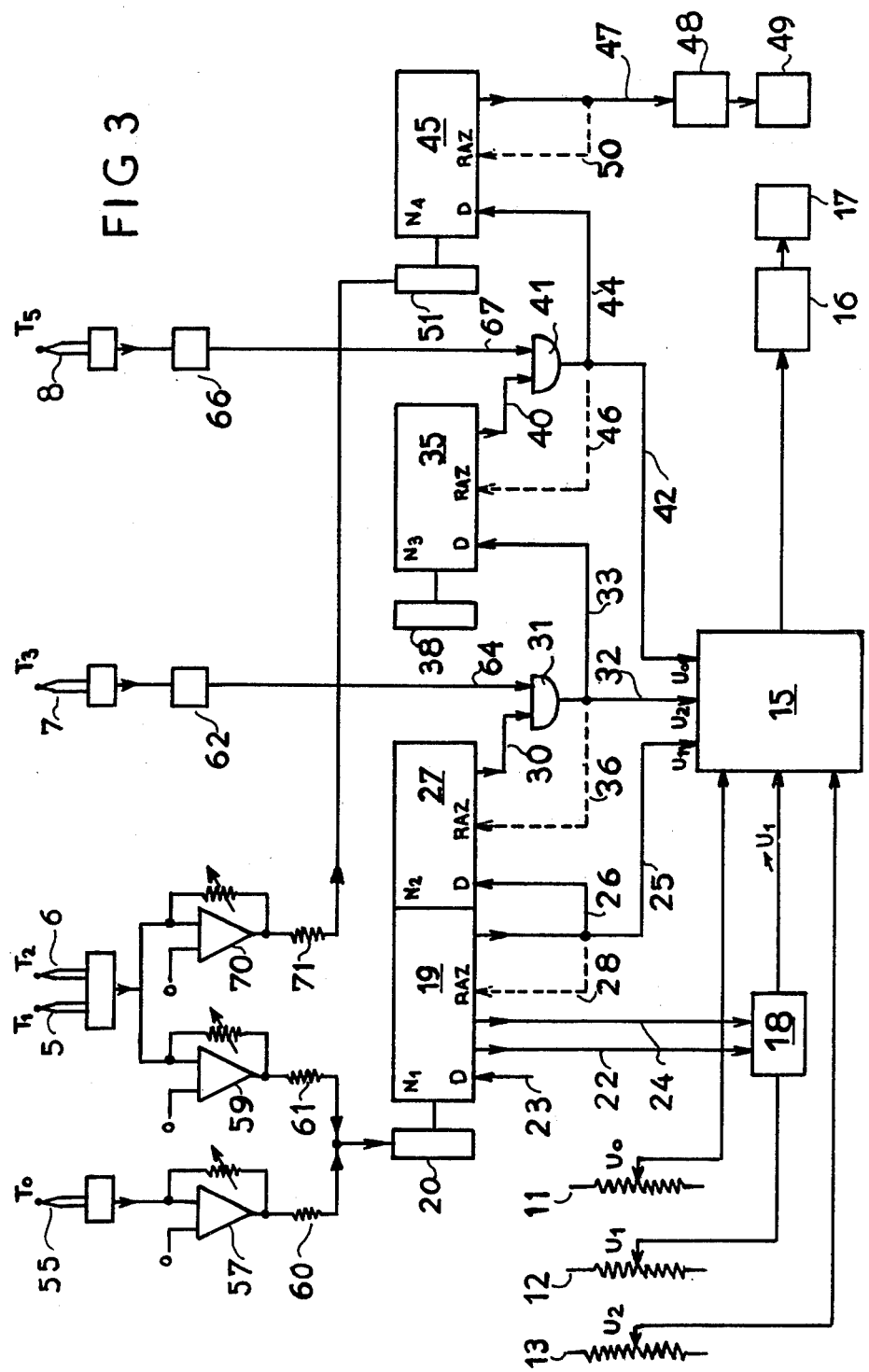

PROCESS AND APPARATUS FOR LOW PRESSURE CASTING

The present invention relates to a process of moulding a metal by low-pressure casting and more particularly by casting using an electromagnetic pump feed. The invention finds a particularly valuable, but not exclusive, application to the moulding of aluminum and its alloys by low-pressure casting.

The invention also relates to apparatus for use in carrying out this process.

Because of the rapidity of response to pressure change controls, feeding by means of an electromagnetic pump is frequently preferred to feeding by means of compressed air for the low-pressure casting of a metal. The present process of casting using an electromagnetic pump feed is carried out in cycles of previously established stages, each stage being defined by a fixed duration and a fixed or variable value of the pressure. These various stages will now be described referring to FIGS. 1 and 2. FIG. 1 schematically represents a mould for low-pressure casting which comprises a body 1 and a cover 2. Liquid metal is introduced into the mould through a runner 3. FIG. 2 shows, for the various stages of casting, the variations in the supply voltage of the electromagnetic pump as a function of time, that is to say, in effect, it shows the variations in the delivery height in the mould and thereby the pressure of the metal in the mould.

In the rest state, the metal is kept at a height which is slightly below that of the inlet of the mould by applying to the pump a voltage $U_0$ set by means of a potentiometer.

To fill the mould, the voltage is set at a value $U_1$ in order to obtain a delivery height which is slightly greater than the height of the upper part of the mould. Thus, when the mould has been filled, the pump creates a slight pressure in the metal which corresponds to a small head of metal, this pressure being applied for a time which, although fairly short, is necessary to form a skin only on the inner walls of the mould, the remainder of the metal being liquid. In fact, the use of an electromagnetic pump makes it possible to obtain better results by progressively increasing the voltage from the rest voltage $U_0$ to the voltage $U_1$, and by then maintaining the voltage $U_1$ for the time which is necessary to form the skin on the inner walls of the mould. FIG. 2 shows the first stage of filling, properly referred to as the progressive speed of entry stage, which lasts for a time $t_1$, and then the second stage for the formation of the skin, which lasts for a time $t_2$.

The progressive increase of the voltage from $U_0$ to $U_1$ is achieved in the usual manner by means of an analog-to-digital converter which makes it possible to divide up the voltage difference $U_0-U_1$ into a number of elementary intervals which is set by means of a preselector associated with a clock couner. The counter thus increases the voltage by one elementary interval at each interval of time defined by the time base of the counter.

The third stage of moulding is a cooling stage during which the full voltage $U_2$ is applied to the electromagnetic pump to produce its maximum delivery pressure in the liquid metal. The skin which has previously formed prevents metal from entering gaps in the mould at the junction between the body 1 and the cover 2, and also from entering air vents. This maximum pressure is maintained whilst the metal solidifies in the mould. It is cut off, by means of a time switch which measures the time $t_3$ required, at the moment when the solidification front of the metal descends into the runner 3.

The time switch may comprise a clock counter equipped with a time base and associated with a preselector for presetting the time $t_3$.

Finally, during a fourth stage, the applied voltage is brought back to the rest value $U_0$ whilst the mould is kept closed in order to complete the solidification of the casting for a time $t_4$ which is limited in order to avoid cooling which would make it impossible to withdraw the casting from the mould. This time $t_4$ can also be determined by a time switch comprising a clock counter which is equipped with a time base and associated with a preselector for presetting the time $t_4$.

The output signals of the counters which control voltage variations are applied to a switch which actuates the circuits for feeding the pump with a variable voltage and, for example, circuits with thyristors. The output signal from the counter for the time $t_4$ actuates the end-of-cycle controls controlling the opening of the mould.

Such an arrangement gives good results in practice when the operating and environmental conditions remain unchanged. However, the temperature of the metal contained in the melting furnace which feeds the pump can, for example, vary, either due to heating failure or because the furnace has been filled with colder or hotter metal. The conditions for thermal equilibrium in the mould are then disturbed and there is a risk of producing poor castings.

It is also possible that, after withdrawal of the casting, the mould may require partial redressing or some maintenance. If the mould then remains open, its temperature will fall and, again, in this case, the equilibrium of the mould will be disturbed and there is the risk that the castings will not be good.

In these two possible cases of disturbance, the parameters of the casting cycle must be changed, that is to say that, in practice, the relative duration of the various stages must be changed as the furnace and the mould regain their normal equilibrium temperature.

This requires time and frequent corrections in order to adjust the elements controlling the cycle.

According to the invention there is provided a process of low-pressure casting a metal in a mould which is fed with metal from below by means of an electromagnetic pump, the process comprises the following stages, starting from an initial position in which the metal to be moulded is at a height which is slightly lower than that of the inlet of said mould:

(a) filling said mould with metal, at an increasing rate, by applying an increasing voltage to said pump until a voltage is reached which corresponds to a delivery height which is slightly greater than that of the top of said mould, (b) holding said voltage until a skin forms on the inner walls of said mould, (c) applying an increased pressure to the metal in said mould until the solification front reaches the inlet of the mould, and (d) at the end of solidification reducing the pressure to said initial pressure and opening said mould, wherein the temperature of the mould and the temperature of the metal in the melting furnace are measured and used to control the duration of the stages (a) and (b), the duration of said stages being reduced when the temperature of the mould or the temperature of the metal in the furnace decreases.

The measurement of the temperature of the mould may also be used to control the duration of the last solidification stage (d), the duration of this stage being reduced when the temperature of the mould decreases.

A measurement of the temperature of the metal in the upper part of the mould may additionally be used to detect when the metal reaches the solidification temperature and thus to end the second filling stage (b).

Finally, a measurement of the temperature of the metal at the inlet of the mould may additionally be used to detect when the metal reaches the solidification temperature and thus to end the third stage (c) of the cycle.

The invention also applies to a device for carrying out the control of the above process.

The invention will be more fully understood from the following description of an embodiment thereof, given by way of example only, with reference to the accompanying drawings.

Figures 4, 5, 6:
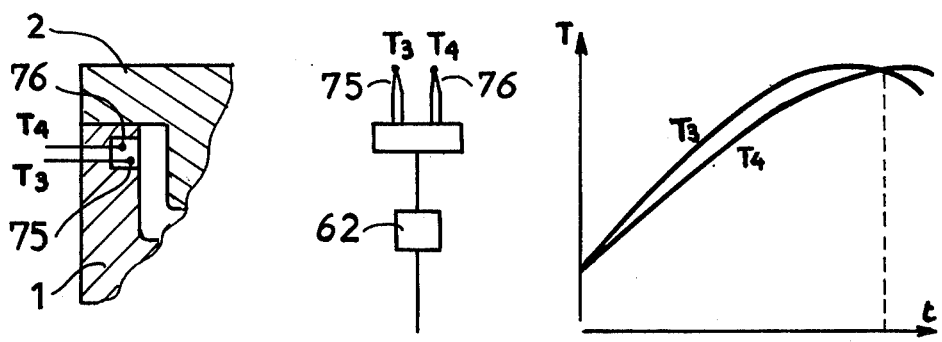

FIG. 3 is a diagrammatic illustration of an embodiment of a control device according to the invention; and FIGS. 4 to 6 relate to another embodiment in which the temperature of the metal at the upper part of the mould is measured by a differential measurement using two associated sensors, FIG. 4 showing the arangement of the two associated temperature sensors, FIG. 5 showing the corresponding modification of FIG. 3, and FIG. 6 showing the variations in the temperatures detected by the two sensors.

Figure 1:
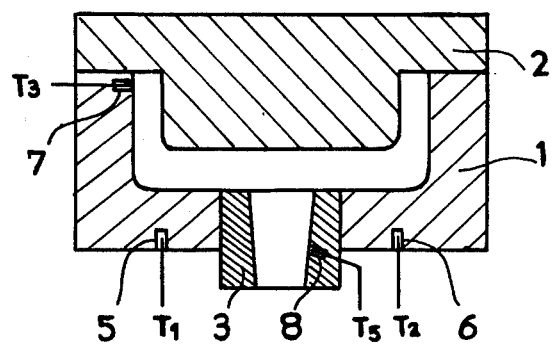
FIG. 1 is a cross-sectional view of the mould illustrating various temperature sensors.
Figure 2:
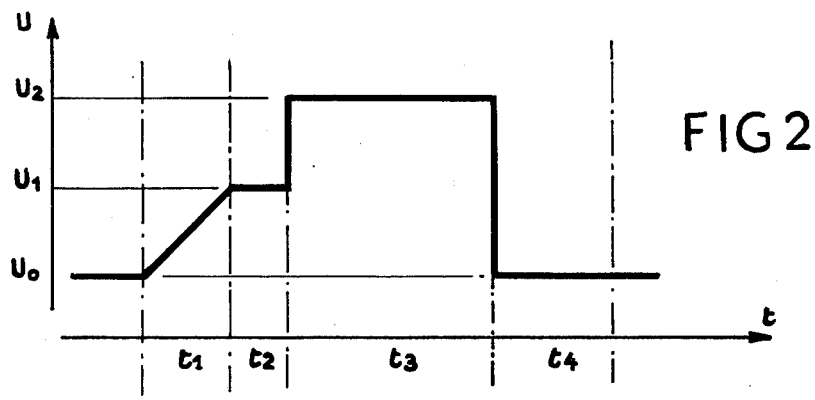
FIG. 2 is a graphical representation of supply voltage of the pump as a function of time for various stages of casting.

Referring firstly to FIG. 1, various temperature sensors 5 to 8 are shown. The sensors 5 and 6 are for measuring the temperatures T1 and T2 of the mould itself and the sensor 7 measures the temperature T3 at the upper part of the mould. The sensor 8 measures the temperature T5 at the inlet or runner of the mould.

Referring now to FIG. 3, the normal components for controlling a low-pressure casting cycle using an electromagnetic pump feed are to be found. The three supply voltages of the pump for the various stages of the cycle are fixed by potentiometers 11, 12 and 13, the rest voltage $U_0$ being taken from potentiometer 11, the holding voltage $U_1$, corresponding to the formation of the skin, being taken from potentiometer 12, and the voltage $U_2$, corresponding to the full pressure during solidification, being taken from potentiometer 13.

The voltages $U_0$ and $U_2$ are connected directly to an analog switch 15 which governs the thyristor control 16 for the supply voltage of electromagnetic pump 17. The voltage $U_1$ is connected to the switch 15 by means of a digital-to-analog converter 18 driven by a clock counter 19.

The clock counter 19 determines the duration of the stage t1 by setting a number N1 of impulses originating from a time base 20. The preset number N1 is transmitted by means of the connection 22 to the converter 18 and defines the number of stages of progression necessary to produce the voltage $U_1$ when counting has ended. Each counting step of the counter 19, which is actuated by a circuit-breaking input 23, is transmitted by means of connection 24 and increases by one stage the voltage which is transmitted by the converter 18 to the switch 15. The output signal when counting has ended, which corresponds to the production of the full voltage $U_1$ on the switch 15, is transmitted by connection 25 to the switch 15 to start the holding of the voltage $U_1$ during the second stage t2. At the same time, the signal actuates a counter 27 by connection 26, and the zeroing of the counter 19 by means of connection 28.

The counter 27 determines the duration of the stage t2 by presetting a number N2 of impulses originating from the same time base 20. The output signal from the counter 27, when counting has ended, which corresponds to the end of the skin-forming stage t2, is transmitted by connection 30 to "OR" gate 31, the output signal of which is itself transmitted by connection 32 to the switch 15 to control the increase of the supply voltage of the pump to the value $U_2$. At the same time, the signal actuates counter 35 by connection 33 and the zeroing of the counter 27 by connection 36.

The counter 35 determines the duration of the stage t3 by presetting a number N3 of impulses originating from a time base 38. The output signal from the counter 35, when counting has ended, which corresponds to the end of the solidification stage t3, is transmitted by connection 40 to "OR" gate 41, the output signal of which is itself transmitted by connection 42 to the switch 15 to control the return of the feed pump to the rest voltage $U_0$. At the same time, the signal actuates counter 45 by connection 44 and the zeroing of the counter 35 by connection 46.

The counter 45 determines the duration of the last stage t4 by presetting a number N4 of impulses originating from a time base 51. The output signal from the counter 45, when counting has ended, which corresponds to the end of complementary solidification stage t4, it transmitted by connection 47 to a relay 48 of a device 49 for controlling opening of the mould. At the same time, the signal actuates the zeroing of the counter 45 by connection 50.

With the exception of the gates 31 and 41, the device which has been described corresponds virtually to a known device, in which the duration of the four stages of the cycle is fixed solely by setting the indices N1, N2, N3 and N4. According to the invention, temperature measurements are involved in the control. As shown, the temperatures are measured by the thermocouples 5, 6, 7 and 8 located on the mould as shown in FIG. 1, and by a thermocouple 55 for measuring the temperature of the metal in the melting furnace. The signal from the thermocouple 55, which represents the temperature $T_0$ of the metal in the furnace, is introduced into the negative feedback circuit of an amplifier 57 in order to reverse the effect of the temperature variation. Likewise, the mean signal from the thermocouples 5 and 6, which represents the mean of the temperatures T2 and T3 recorded on the mould and, consequently, the mean value of the temperature of the mould, is introduced into the negative feedback circuit of an amplifier 59 in order also to reverse the effect of the temperature variation. The outputs of the amplifiers 57 and 59 are applied, via loading resistors 60 and 61, to the circuit for controlling the time base 20 which drives the counters 19 and 27.

If for any reason the temperature of the furnace or the temperature of the mould decreases, necessitating an increase in the rate of introduction of the metal into the mould, the control of the time base 20 will be changed so as to shorten the period of the impulses. For a number N1 of impulses to be counted, a reduction in the absolute duration of the counting will result, that is to say the same number of stages of progression of the voltage U₁ will be obtained but in a shorter time, and the progression of the rate of introduction of the metal into the mould will be increased. Likewise, the duration of the stage t2 for holding the voltage at U₁ will be shortened by reducing the duration of the elementary impulses counted in the counter 27.

However, the end of the stage t2 can occur as soon as the skin has formed, that is to say as soon as a first solidification has taken place in contact with the walls in the upper part of the mould. Therefore, the measurement of the temperature at the top of the mould by the thermocouple 7 is used. The signal from the thermocouple 7, which represents the temperature T3, is applied to a threshold detector 62 which is set to output when the temperature T3 reaches the solidication temperature of the metal. The detection signal from detector 62 is applied by connection 64 to the input of the OR gate 31 in parallel with the signal from the counter 27 when counting has ended. It is therefore possible to use the counter 27 only as a safety means, in order to instruct the switch 15 to proceed to stage t3 only if detection of the solidication has not occurred by thermocouple 7 or detector 62. However, in normal operation, advantage will thus be taken of all the factors which can lead, for example, to an acceleration of solidification, in order to reduce the stage t2 accordingly and, in effect, to reduce the total casting cycle.

A completely equivalent arrangement is provided for the end of the solidification stage t3 which can be interrupted as soon as the solidification front has reached the runner 3. The measurement of the temperature at the runner by means of the thermocouple 8 is used. The signal from the thermocouple 8, which represents the temperature T5, is applied to a threshold detector 66 which is set to output when the temperature T5 reaches the solidification temperature of the metal. The detection signal is applied by connection 67 to the input of the OR gate 41, in parallel with the signal from the counter 35 when counting has ended. Again, in this case, it is possible for the counter 35 to be used only as a safety means. In normal operation, advantage will be taken of all the factors which make it possible to reduce the duration of the stage t3 and, in effect, the duration of the total casting cycle.

Finally, the duration of the last stage t4 for the end of solidification is also automatically set so as to take account of the actual casting conditions, in such a way that it follows a reverse pattern to that of the temperature of the mould, because the solidification will be the more rapid, the lower is the temperature of the mould. The measurement of the mean tamperature of the mould by means of the thermocouples 5 and 6 is therefore used. The signal representing the mean of the measured temperatures T2 and T3 is introduced into the negative feedback circuit of an amplifier 70 to reverse the effect of temperature variations. The output from the amplifier 70 is applied, via a loading resistor 71, to the circuit for controlling the time base 51 which drives the counter 45. A decrease in the temperature of the mould will therefore result in a reduction in the period of the impulses counted at 45 and, for the same set number N4, it will lead to a reduction in the duration of the stage t4 which is terminated by opening the mould.

Of course, the invention is not strictly limited to the embodiment which has now been described by way of example, but also covers those embodiments which only differ therefrom in details, in alternative embodiments and in the use of equivalent means.

It would thus be possible to provide each of the counters 19 and 27, which determine the stages t1 and t2, with its own time base instead of using the same time base. It would thus be possible, for example, to apply a different degree of correction to each of the two stages.

It is also possible to detect the formation of the skin at the end of the stage t2 by using a differential temperature measurement. In this modification, which is shown in FIGS. 4, 5 and 6, the thermocouple 7 is replaced by two thermocouples 75 and 76, arranged at slightly staggered heights, with the upper thermocouple 76 being slightly more set back from the mould cavity (FIG. 4). The thermocouples 75 and 76 respectively record temperatures T3 and T4. The curves in FIG. 6 represent the change in the temperatures T3 and T4 during a casting operation, and it is seen that T4 is always slightly behind T3. If these two thermocouples are connected in opposition on a differential measuring apparatus, the latter will detect a voltage in one direction for the rising part of the curve, a zero near the peak where the two curves of T3 and T4 intersect, and then a reversed voltage in the descending part of the curve. The skin begins to form inside the mould when the temperature begins to decrease. It is therefore when the differential measuring apparatus reaches zero that the end of the stage t2 will be actuated. In the diagram of FIG. 3 modified in accordance with this modification, the threshold detector 62 is replaced by a zero detector.

There is thus provided an improved process wherein it is possible to automatically take into account the variable operating and environmental conditions, in order to continuously control the casting parameters and adapt them to the actual working conditions. This control takes account of the fact that, when the temperature of the mould or the temperature of the metal at the inlet of the mould falls, it is desirable to introduce the metal more rapidly into the mould in order to prevent the metal from solidifying before the mould is full.

It is also possible to avoid prolonging the filling stage of the mould and the solidification stage unnecessarily.

What is claimed is:

1. In a process of low-pressure casting a metal in a mould which is fed with metal from below by means of an electromagnetic pump, the process comprising the following stages, starting from an initial position in which the metal to be moulded is at a height which is slightly lower than that of the inlet of said mould:
    (a) filling said mould with metal, at a predetermined acceleration, by applying an increasing voltage to said pump until a voltage is reached which corresponds to a delivery height which is slightly greater than that of the top of said mould;
    (b) holding said voltage until a skin forms on the inner walls of said mould;
    (c) applying an increased pressure to the metal in said mould until the solidification front reaches the inlet of said mould; and
    (d) at the end of the solidification, reducing the pressure to said initial pressure and opening said mould; the improvement comprising measuring the temperature of said mould and the temperature of the metal in the melting furnace, and filling said mold at an acceleration greater than said predetermined acceleration
    when the respective temperatures are lower than a predetermined value, and filling said mold at an acceleration smaller than said predetermined acceleration when the respective temperatures are higher than said predetermined value.

2. The improvement according to claim 1, including measuring the temperature of the metal in the upper part of the mould and using the measurement to detect when the metal reaches the solidification temperature and to end the stage (b).

3. The improvement according to claim 2, wherein said temperature of the metal in the upper part of the mould is measured at two neighbouring locations, one of which locations is closer to the mold cavity than the other, the time when the solidification temperature is reached being indicated when the difference between the measurements is zero.

4. A device for controlling the low-pressure casting of a metal in a mould which is fed with metal from below by means of an electromagnetic pump, said device comprising:
   means for generating a plurality of supply voltages for an electromagnetic pump;
   first, second, third and fourth clock counters with preselection, which are a connected in series sequence to determine the duration of respective casting operations including: mould filling; skin formation on mould wall interior; formation of solidification in mould inlet; opening of said mould; respectively;
   an analog switch associated with means for controlling the supply voltage of said pump, and connected to be controlled by output signals from said first, second and third clock counters for selectively applying the corresponding voltages to said pump;
   means for controlling the opening of the mould and which is controlled by said fourth clock counter; at least one temperature sensor for said mould and one temperature sensor for the metal in the melting furnace; a variable time base means for said first and second clock counters; and
   a reversing amplifier associated with each said temperature sensor and connected to said variable time base means.

5. A device according to claim 4, wherein said fourth clock counter is driven by a variable time base which is connected to the output of a reversing amplifier associated with a temperature sensor for the mould.

6. A control device according to claim 5, comprising a temperature sensor for the metal in the upper part of the mould, a threshold detector connected to said temperature sensor, and an "OR" circuit connected to the output from said second counter and the output of said threshold detector, the output of said "OR" circuit being connected to said analog switch and to actuate said third counter.

7. A control device according to claim 4, comprising a temperature sensor for the metal in the upper part of the mould, a threshold detector connected to said temperature sensor, and an "OR" circuit connected to the output from said second counter and the output of said threshold detector, the output of said "OR" circuit being connected to said analog switch and to actuate said third counter.

8. A control device according to either claim 4 or claim 5 or claim 6, or claim 7 comprising: a temperature sensor for the metal at the inlet of the mould, a threshold detector connected to said temperature sensor, and an "OR" circuit connected to the output of said third counter and the output of said threshold detector, the output of said "OR" circuit being connected to said analog switch and to actuate said fourth counter.

* * * * *